United States Patent
Leonard

(10) Patent No.: US 7,641,182 B2
(45) Date of Patent: Jan. 5, 2010

(54) RIGID JOUNCE BUMPER AND GAS SPRING ASSEMBLY INCLUDING SAME

(75) Inventor: Joshua R. Leonard, Noblesville, IN (US)

(73) Assignee: BFS Diversifield Products, LLC

( * ) Notice: Subject to any disclaimer, the term of this patent is extended or adjusted under 35 U.S.C. 154(b) by 0 days.

(21) Appl. No.: 11/897,807

(22) Filed: Aug. 31, 2007

(65) Prior Publication Data

US 2009/0057970 A1    Mar. 5, 2009

(51) Int. Cl.
F16F 9/04 (2006.01)

(52) U.S. Cl. .................. 267/64.24; 267/64.27

(58) Field of Classification Search .............. 267/64.21, 267/64.24, 64.27, 152, 153
See application file for complete search history.

(56) References Cited

U.S. PATENT DOCUMENTS

| | | | |
|---|---|---|---|
| 4,428,568 A | 1/1984 | McNatt et al. | |
| 4,681,304 A * | 7/1987 | Hassan | 267/220 |
| 4,804,169 A * | 2/1989 | Hassan | 267/220 |
| 4,805,886 A | 2/1989 | Hassan | |
| 4,925,224 A * | 5/1990 | Smiszek | 293/120 |
| 5,308,104 A | 5/1994 | Charles | |
| 6,070,861 A * | 6/2000 | Ecktman | 60/778 |
| 6,109,598 A * | 8/2000 | Hilburger et al. | 267/64.24 |
| 6,234,460 B1 * | 5/2001 | Arnold | 267/35 |
| 6,485,008 B1 * | 11/2002 | Griffin | 267/220 |
| 6,820,883 B2 | 11/2004 | Lang et al. | |
| 6,824,143 B2 | 11/2004 | Choi | |

FOREIGN PATENT DOCUMENTS

| | | |
|---|---|---|
| DE | 18 54 642 U | 7/1962 |
| EP | 0 943 836 A | 9/1999 |
| JP | 04 060232 A | 2/1992 |
| WO | WO 01/01013 A | 1/2001 |

* cited by examiner

*Primary Examiner*—Christopher P Schwartz
(74) *Attorney, Agent, or Firm*—Thomas R. Kingsbury; Sarah M. Jabbari; Matthew Dugan

(57) ABSTRACT

A rigid jounce bumper includes a body and at least one support segment projecting axially from an end of the body. The rigid jounce bumper is formed from a substantially non-elastic material such that the rigid jounce bumper can support axially-applied loads without undergoing substantial axial deflection. The at least one support segment is capable of displacement relative to the body when under laterally-applied loads. A gas spring assembly having such a rigid jounce bumper is also included.

20 Claims, 12 Drawing Sheets

RIGID JOUNCE BUMPER AND GAS SPRING ASSEMBLY INCLUDING SAME

BACKGROUND

The subject matter of the present disclosure broadly relates to the art of vehicle suspension systems and, more particularly, to a rigid jounce bumper that is capable of providing substantially rigid support of axially-applied loads and also capable of lateral deflection under laterally-applied loads. A gas spring assembly including such a rigid jounce bumper is also disclosed.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Generally, the range of motion of a suspension system extends between a first or fully compressed condition and a second or fully extended condition. To eliminate contact between opposing portions of the sprung and unsprung masses, contact between opposing portions of components of the suspension system or contact between any combination thereof, jounce bumpers are commonly installed on one or more portions of the vehicle to prevent such opposing portions from directly impacting one another. Thus, during jounce motion of the suspension system, an opposing component will contact the jounce bumper rather than impacting the component on or near which the jounce bumper is mounted.

Jounce bumpers of a variety of types, kinds and configurations have been developed and are commonly used. Though the size and shape of jounce bumpers vary widely, known jounce bumpers can generally be grouped into two categories, namely, compliant jounce bumpers and rigid jounce bumpers. The former are commonly formed from materials capable of relatively high deflections under load, and are often formed from rubber or elastomeric foam compounds.

Generally, compliant jounce bumpers act to cushion or otherwise soften the impact that would otherwise be associated with a sudden movement toward a full jounce condition. As such, compliant jounce bumpers are well suited for use in relatively light duty applications, such as use in the suspension systems of passenger vehicles and light trucks, for example, where ride comfort is a more significant factor. Additionally, the materials from which such compliant jounce bumpers are formed is normally capable of withstanding at least some amount of lateral deflection, such as would be due to a laterally-applied load, without undergoing permanent deformation or another undesirable alteration of its performance characteristics. Furthermore, suspension systems used in passenger and other light-duty applications typically permit a relatively small or otherwise reduced amount of lateral displacement, which is normally well within the capability of known compliant jounce bumpers to withstand.

Unfortunately, the elastomeric materials that result in compliant jounce bumpers being so well suited for high-comfort, light-duty applications have generally been found to be quite poorly suited for high-load and/or heavy-duty applications.

One exemplary reason for such a lack of suitability for use in heavy-duty applications relates to the elastomeric nature of the material itself. More specifically, for a given compliant jounce bumper to have a suitable compressed height (i.e., a compressed height that will be sufficient to inhibit contact between opposing suspension components under a heavy load), the corresponding free height of such a given compliant jounce bumper would likely be great enough to adversely effect the overall travel or other performance characteristics of the suspension system. Said differently, the elastomeric material would have to compress so much to support the high-load condition that the unloaded height of the material could result in the compliant jounce bumper undesirably interfering with the performance of the suspension system or components thereof.

Other exemplary difficulties with the use of compliant jounce bumpers under high-load and/or heavy-duty conditions involve the performance of such compliant bumpers when contacted at relatively high angles. As has been previously mentioned, in order to support a substantial load at a given height, a compliant bumper must possess a taller free height due to its high level of axial strain. Many suspension geometries allow the mounting spring surfaces to articulate at an angle relative to one another, such as in a trailing arm-type suspension, for example. On such suspensions, a taller compliant jounce bumper would contact the opposing structural member much earlier in the suspension travel and at a greater angle. When contacted at a relatively high angle, such as an angle of about 10 degrees or more, for example, a compliant jounce bumper will deflect laterally. This can undesirably increase the possibility of interference with other components and can also undesirably reduces suspension travel. In contrast, a less compliant jounce bumper would be able to utilize a lower free height and would normally contact the opposing structural member at a later point during suspension travel. Thus, the structural member will typically contact a less-compliant jounce bumper at a lower angle which will thereby minimize the aforementioned issues with compliant jounce bumper. One further issue involves maintaining the attachment of such compliant jounce bumpers on a corresponding securement feature under such high levels of lateral displacement and contact angle.

Oppositely, rigid jounce bumpers are commonly formed from materials that deflect a relatively small amount under load, such as high strength and/or fiber reinforced plastic materials, for example. Rigid jounce bumpers are not normally considered to be well suited for use in light duty applications (e.g., passenger vehicle applications) because of the minimal deflection and corresponding ride harshness that is associated with the use of such jounce bumpers. However, rigid jounce bumpers are well suited for heavy duty applications, such as in truck, tractor-trailer and other over-the-road vehicle applications, for example, where it is desirable to provide a sacrificial component that can prevent impacts between more permanent and/or expensive components. Additionally, it is often desirable to lower trucks, trailers or other vehicle bodies onto the jounce bumpers to provide a solid foundation for loading and/or unloading of the vehicle body.

Unfortunately, known rigid jounce bumpers are not well suited for accommodating laterally-applied or side load conditions. One example of such a condition can occur when a rigid jounce bumper is axially compressed between opposing structural members and the structural members are then moved laterally relative to one another. Such an action is sometimes referred to in the art as a "scrub load" and can generate a shearing action on the rigid jounce bumper that can result in permanent deformation or other undesirable alterations in the jounce bumper due to the highly rigid (i.e., substantially non-elastomeric) nature of the material forming the same. Accordingly, it is believed desirable to develop a rigid jounce bumper that overcomes the foregoing and other disadvantages of known constructions.

BRIEF DESCRIPTION

One exemplary embodiment of a rigid jounce bumper in accordance with the present novel concept is provided that includes a body having a longitudinally-extending axis and including inner and outer side walls disposed about the axis. The inner and outer side walls extend longitudinally along the axis between opposing first and second body ends with at least one body cavity being disposed between the inner and outer side walls. A plurality of support segments project axially beyond the first body end. The plurality of support segments are disposed about the axis with each of the plurality of support segments including a segment side wall that at least partially defines a segment cavity formed therein. The body and the plurality of support segments are formed from a substantially non-elastomeric material such that the rigid jounce bumper can support axially-applied loads without substantial axial deflection while the segment side walls of the plurality of support segments can deflect relative to the body under laterally applied loads.

Another embodiment of a rigid jounce bumper in accordance with the present novel concept is provided that is adapted for securement along an associated end member of an associated gas spring within an associated spring chamber thereof. The rigid jounce bumper includes a body portion having a central axis that extends between spaced first and second body ends. The body portion includes inner and outer side walls that extend circumferentially about the axis between the first and second body ends. The inner side wall at least partially defines a central passage through the body portion. The body portion also includes at least one body cavity formed thereinto from along the first body end and extending toward the second body end. The at least one body cavity is disposed radially between the inner and outer side walls. At least one support segment is disposed about the axis. The at least one support segment includes a first segment wall portion projecting outwardly from the second body end of the body portion. The at least one support segment also includes a second segment wall portion extending from the first segment wall portion toward the first body end of the body portion. The body portion and the at least one support segment is formed from at least one substantially-rigid plastic material such that the rigid jounce bumper is capable of supporting an axially-applied load without substantial axial deformation and while the at least one support segment is capable of laterally deflecting under a laterally-applied load.

A gas spring assembly in accordance with the present novel concept is provided that includes a first end member, a second member spaced from the first end member and a flexible wall secured between the first and second end members that at least partially defines a spring chamber therebetween. The flexible wall also at least partially defines a central axis extending longitudinally between the first and second end members. A rigid jounce bumper is supported within the spring chamber along one of the first and second end members. The rigid jounce bumper includes a bumper body that has a central axis. The rigid jounce bumper also includes at least one support segment that is operatively connected to the bumper body such that the at least one support segment can deflect under a laterally-applied load without undergoing permanent plastic deformation as well as support an axially-applied load without substantial axial deflection. The rigid jounce bumper is at least partially formed from a non-elastomeric plastic material having an elongation at its elastic tensile limit of less than about 150 percent. The at least one support segment includes an axially-extending side wall that at least partially forms a segment cavity within the at least one support segment. The axially-extending side wall includes a first side wall portion that extends at least partially into the bumper body and a second side wall portion that projects outwardly beyond the bumper body.

DETAILED DESCRIPTION

The term "elastic tensile limit," as used herein, is to be interpreted to mean the limit of distortion that a material can undergo and still return to its original form when relieved from stress.

Terms including "rigid," "non-compliant," "non-elastic," "non-elastomeric" and the like, as used herein, are to be interpreted to encompass any material that has an elongation at its elastic tensile limit of less than about 150 percent, and preferably has an elongation at its elastic tensile limit of less than about 50 percent. Exemplary "rigid" materials include fiber reinforced thermoplastics, such as glass (or other) fiber-reinforced polypropylene and glass (or other) fiber-reinforced polyamide, for example, and high-strength (unfilled) thermoplastics, such as polyester, polyethylene and polyether or any combination thereof, for example.

Terms including "non-rigid," "compliant," "elastic," "elastomeric" and the like, as used herein, are to be interpreted to encompass any material that has an elongation at its elastic tensile limit of greater than about 200 percent, and typically has an elongation at its elastic tensile limit of greater than about 400 percent. Exemplary "compliant" materials include, for example, natural rubber, synthetic rubber and thermoplastic elastomers, which can be use in foam and/or solid forms.

The term "yield stress," as used herein, is to be interpreted to mean the magnitude of force per unit area at which a material begins to plastically deform (i.e., to exceed its elastic tensile limit).

Figure 1:
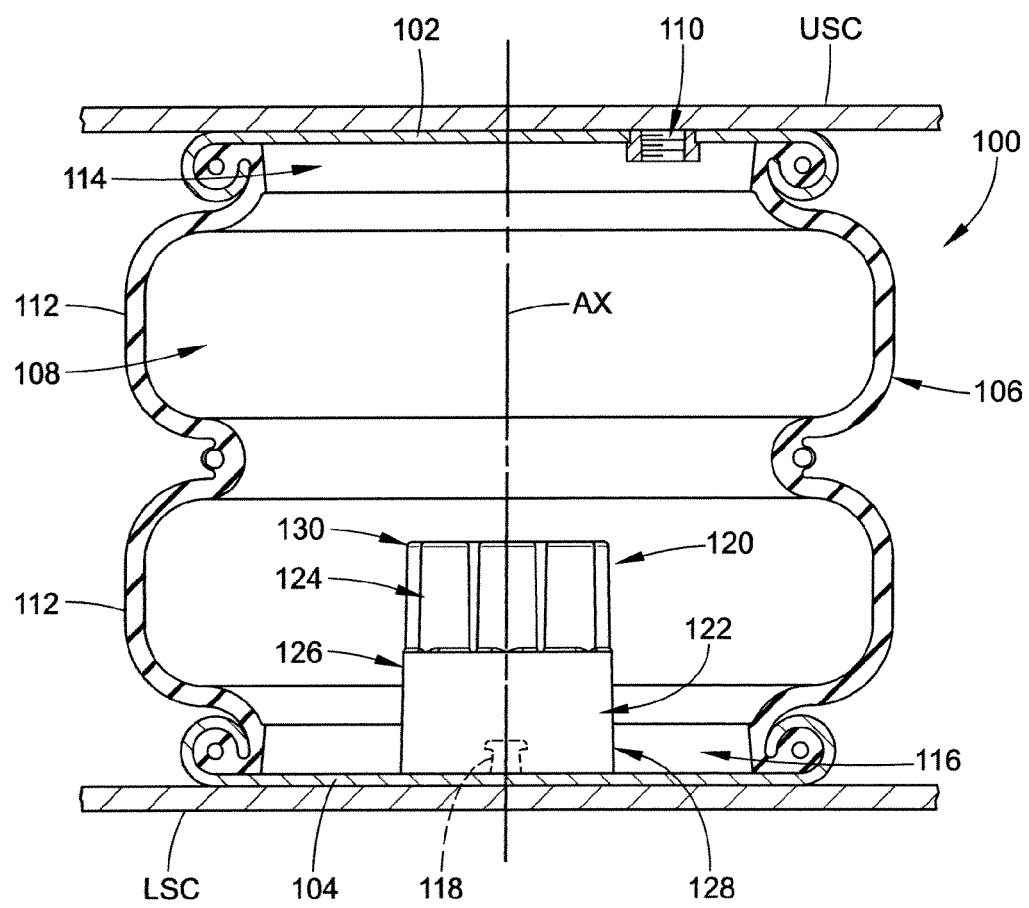
FIG. 1 is a side view of one exemplary embodiment of a rigid jounce bumper in accordance with the present novel concept shown in use within a gas spring assembly.

Turning now to the drawings wherein the showings are for the purpose of illustrating exemplary embodiments of the present novel concept and which are not intended as a limitation of the same, FIG. 1 illustrates a gas spring assembly 100 that includes a first or upper end member 102 and a second or lower end member 104 spaced from the first end member. A flexible wall 106 is secured between the first and second end members and at least partially defines a spring chamber 108 therebetween. The gas spring assembly is suitable for containing a quantity of pressurized gas that can be transferred into and out of spring chamber 108 in any suitable manner, such as through a suitable gas transmission line (not shown) secured using a suitable fitting (not shown) to a threaded connection 110 provided along first end member 102, for example.

Gas spring assembly 100 also includes a spring axis AX1 extending longitudinally through the gas spring assembly between the first and second end members thereof. Flexible wall 106 is preferably disposed about spring axis AX1 such that the axis extends approximately centrally through the gas spring assembly. The flexible wall of gas spring assembly 100 is shown in FIG. 1 as being of a bellows-type configuration having multiple convolutions 112. Additionally, the flexible wall includes opposing open ends 114 and 116, which open ends can be respectively secured on first and second end members 102 and 104 in any suitable manner, such as by using roll-crimped connections as shown in FIG. 1, for example. It is to be distinctly understood, however, that a gas spring assembly of any suitable type, kind and/or construction could alternately be used, such as a rolling lobe-type gas spring assembly, for example. As such, it will be understood that gas spring assembly 100, which is shown and described herein, is merely exemplary of one suitable gas spring construction.

In use, the gas spring assembly will normally be disposed between spaced structural members or components. As such, gas spring assembly 100 is shown in FIG. 1 as being operatively disposed between upper and lower structural components USC and LSC, and can be secured thereto in any suitable manner, such as by using suitable fasteners (not shown), for example. It will be appreciated that the gas spring assembly can be installed or otherwise used in any suitable application or environment, such as in a vehicle suspension system or as a component in a mounting/support application for industrial or other equipment, for example. Thus, upper and lower structural components USC and LSC can be representative of any suitable components, structures or features.

An exemplary embodiment of a rigid jounce bumper in accordance with the present novel concept is shown in FIG. 1 as being disposed within spring chamber 108 of gas spring assembly 100 and can be supported therein in any suitable manner. As one example, a bumper mount 118 can be secured on or otherwise extend from one of the end members (e.g., second end member 104 in FIG. 1), and the rigid jounce bumper can be received thereon for securement within the spring chamber. However, it will be appreciated that any other suitable securement features and/or arrangement can alternately be used.

The exemplary rigid jounce bumper in FIG. 1 is generally indicated therein by item number 120 and includes a body or body portion and at least one support segment extending from the body portion. It will be appreciated that any suitable number of support segments can be used, such as from 1 to 50 support segments, for example. In the exemplary embodiment shown in FIG. 1, the body or body portion is identified by item number 122 and a plurality of support segments, which is illustrated in FIG. 1 as including seven (7) support segments, are collectively indicated by item number 124. Body 122 includes opposing first and second body ends 126 and 128 with the first body end being disposed toward first end member 102 and the second body end shown as being secured in abutting engagement along second end member 104. Support segments 124 are shown projecting outwardly from body 122 beyond first body end 126 and generally extend to a free or contact end 130 thereof. Support segments 124 can include a first segment wall portion 124A that extends outwardly from body 122 and a second segment wall portion 124B that is formed within body 122. In the exemplary embodiment shown, second segment wall portion 124B is a substantially planar wall having an approximately rectangular cross-section.

Figure 2:
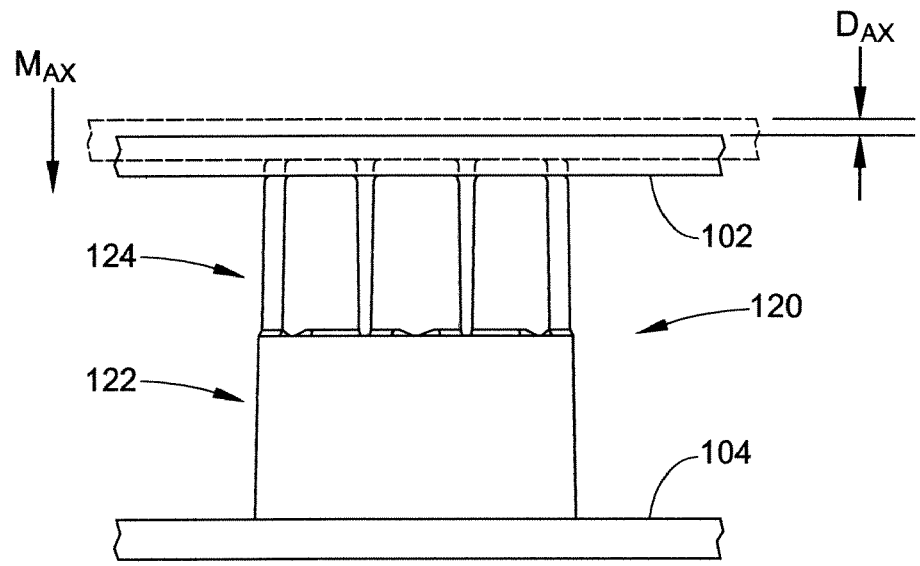
FIG. 2 is a side view illustrating the gas spring assembly and rigid jounce bumper of FIG. 1 undergoing an axially-applied load.
Figure 3:
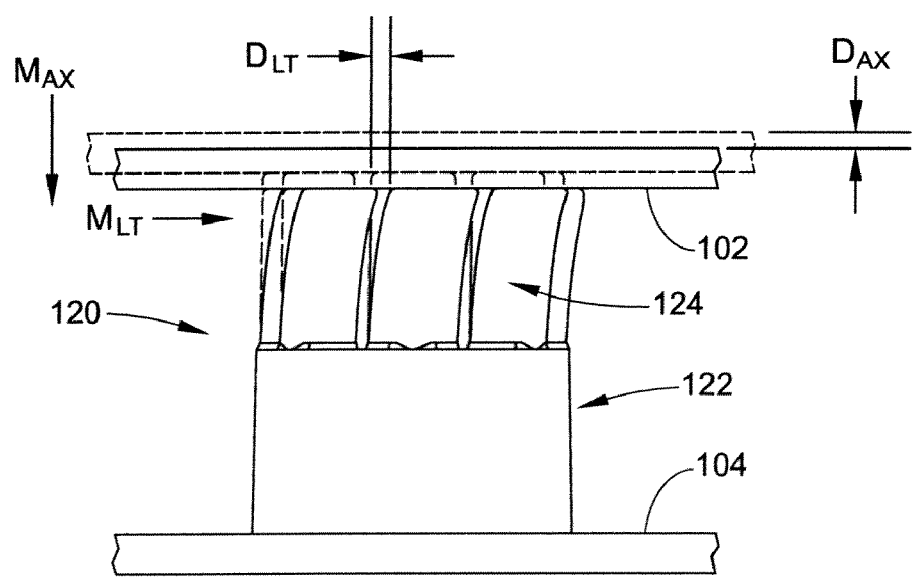
FIG. 3 is a side view illustrating the gas spring assembly and rigid jounce bumper in FIG. 1 undergoing axially-applied and laterally-applied loads.
Figure 4:
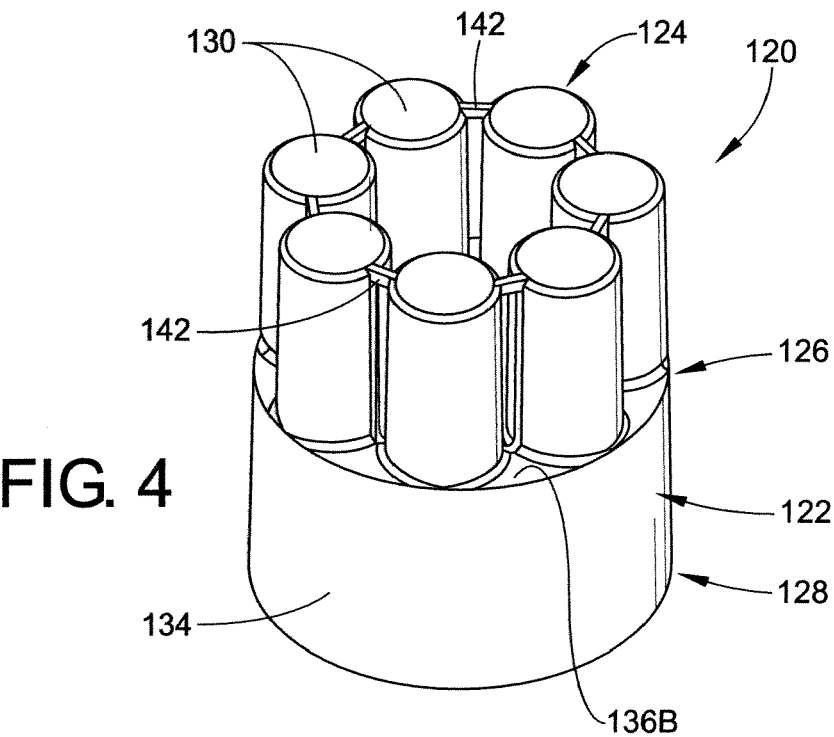
FIG. 4 is a top perspective view of the rigid jounce bumper shown in FIGS. 1-3.
Figure 5:
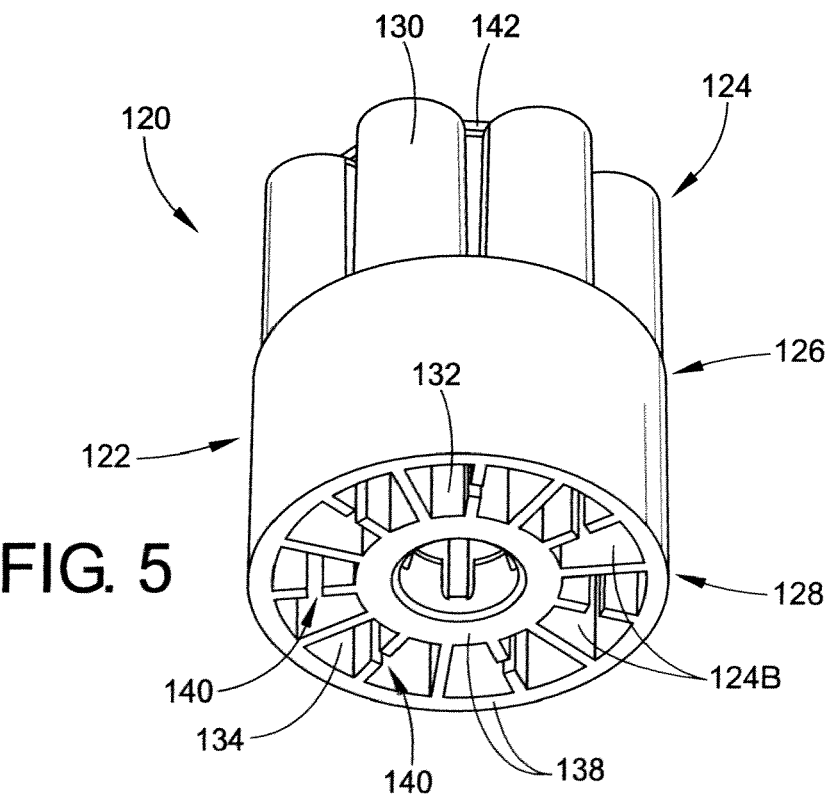
FIG. 5 is a bottom perspective view of the rigid jounce bumper shown in FIGS. 1-4.
Figure 6:
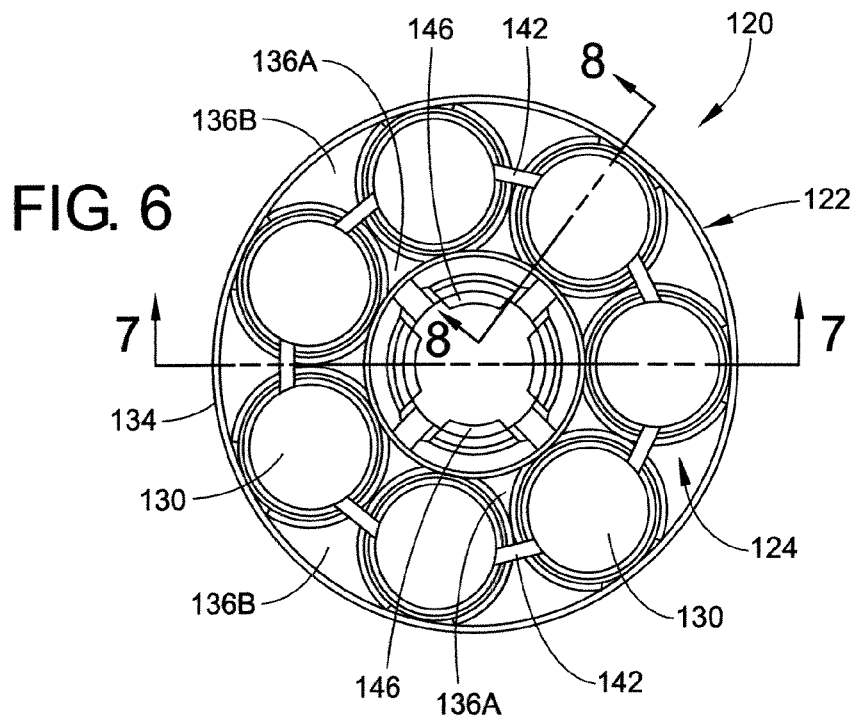
FIG. 6 is a top view of the rigid jounce bumper shown in FIGS. 1-5.

With reference to FIGS. 2 and 3, first and second end members 102 and 104 of the gas spring assembly are shown displaced toward one another a distance sufficient for the first end member to engage free end 130 of support segments 124 of the rigid jounce bumper. As shown in FIG. 2, further axial movement of the first and second end members toward one another, as represented by arrow $M_{AX}$, such as would be due to a load acting thereon or a force otherwise applied thereto, for example, will result in at least some amount of compressive deformation of rigid jounce bumper 120, as is generally represented by dimension $D_{AX}$. It will be recognized that the amount of axial deformation undergone by the rigid jounce bumper will depend upon a variety of factors, such as the magnitude of the load, the properties of the jounce bumper material and the configuration of the rigid jounce bumper itself (e.g., size, shape and wall thicknesses). Additionally, it will be appreciated that dimension $D_{AX}$ is not to scale and is shown greatly exaggerated in FIG. 2 for illustrative purposes.

As previously discussed, conventional rigid jounce bumpers are typically capable of supporting such an axially-applied load without undergoing substantial axial deflection. One beneficial aspect of a rigid jounce bumper in accordance with the present novel concept (e.g., rigid jounce bumper 120) is that this axial stiffness is maintained, as is represented by dimension $D_{AX}$. Thus, a rigid jounce bumper in accordance with the present novel concept, such as rigid jounce bumper 120, for example, is capable of supporting an axially-applied load without undergoing substantial axial deflection.

Generally, however, it is relatively uncommon for a purely (or substantially purely) axial load to be applied to jounce bumper. Rather, typical load conditions will include both an axially-directed component as well as a laterally-directed component. Such conditions can be generated by an end member of the gas spring assembly contacting the jounce bumper at an angle such that both axially and laterally-directed load conditions are generated. Alternately, such conditions can be generated by relatively separate or distinct movements. For example, an end member of the gas spring assembly can be axially displaced to generate an axially-compressive load on the rigid jounce bumper. During the application of such axial load or at some time thereafter, the opposing end members of the gas spring assembly can be laterally displaced relative to one another. Such lateral displacement while the rigid jounce bumper is undergoing an axially-compressive load is sometimes referred to in the art as a "scrub" load.

Regardless of the manner in which it is generated, known rigid jounce bumpers are poorly suited for such laterally-applied load conditions. However, a rigid jounce bumper in accordance with the present novel concept can accommodate such laterally-applied loads without permanent deformation or other damage. With reference to FIG. 3, gas spring assembly 100 is shown undergoing the axial movement of the first and second end members toward one another represented by arrow $M_{AX}$, as discussed above, which results in the axial deflection of rigid jounce bumper 120 as is represented by dimension $D_{AX}$. Gas spring assembly 100 is also shown undergoing a lateral movement of the first end member relative to the second end member, as represented by arrow $M_{LT}$. This lateral displacement of the end members results in a lateral deflection of support segments 124 of rigid jounce bumper 120 relative to body portion 122 thereof, as is represented by dimension $D_{LT}$, which is shown with reference to free ends 130 of the support segments.

Again, it will be recognized that the amount of axial and lateral deformation undergone by the subject rigid jounce bumper will depend upon a variety of factors, such as, for example, the magnitude of the axial and lateral loads, the magnitude of the coefficient of friction between the end member and the free ends of the support segments, the properties of the jounce bumper material, and the configuration of the rigid jounce bumper itself (e.g., size, shape and wall thicknesses). In one embodiment, the subject rigid jounce bumper is preferably designed, in light of the foregoing and/or other factors, such that the magnitude of at least the lateral deflection under a typical range of load conditions will permit the support segments to return to approximately the prior position, alignment and/or orientation thereof upon abatement of the laterally-applied load without undergoing permanent deformation. Additionally, it will be appreciated that dimensions $D_{AX}$ and $D_{LT}$ are not to scale and are shown exaggerated in FIG. 3 for illustrative purposes.

FIGS. 4-8 illustrate rigid jounce bumper 120 in greater detail. Body 122 thereof includes an inner side wall 132 and an outer side wall 134 spaced radially outwardly from the inner side wall. The inner and outer side walls extend about axis AX2 (FIG. 7) of the rigid jounce bumper generally between body ends 126 and 128 thereof. Body 122 includes a first end wall 136 disposed approximately transverse to axis AX2 along first body end 126. Depending upon the configuration and/or construction of support segments 124, body end wall 136 can include one or more discrete wall portions, such as a plurality of end wall first portions 136A and a plurality of end wall second portions 136B, for example. Additionally, body 122 includes a second body end wall 138 disposed along second body end 128. In one exemplary embodiment, second body end wall 138 forms an open second body end 128 of body 122 such that a plurality of chambers or cavities 140 are formed therein and extend from along second body end 128 toward first body end 126. First body end wall 136 and/or the portions thereof can form a substantially closed end of the cavities. Optionally, cavities 140 and/or other open portions or chambers of the rigid jounce bumper can be filled or otherwise include a quantity of one or more other materials (not shown) to further modify or otherwise alter the axial and/or lateral deflection characteristics and/or other features or properties of the subject rigid jounce bumper. Such one or more other materials, if included, could be of any suitable type and/or kind, such as a quantity of a more-compliant material, a quantity of a more-rigid material and/or a second quantity of the same material as the rigid jounce bumper, for example.

Figure 7:
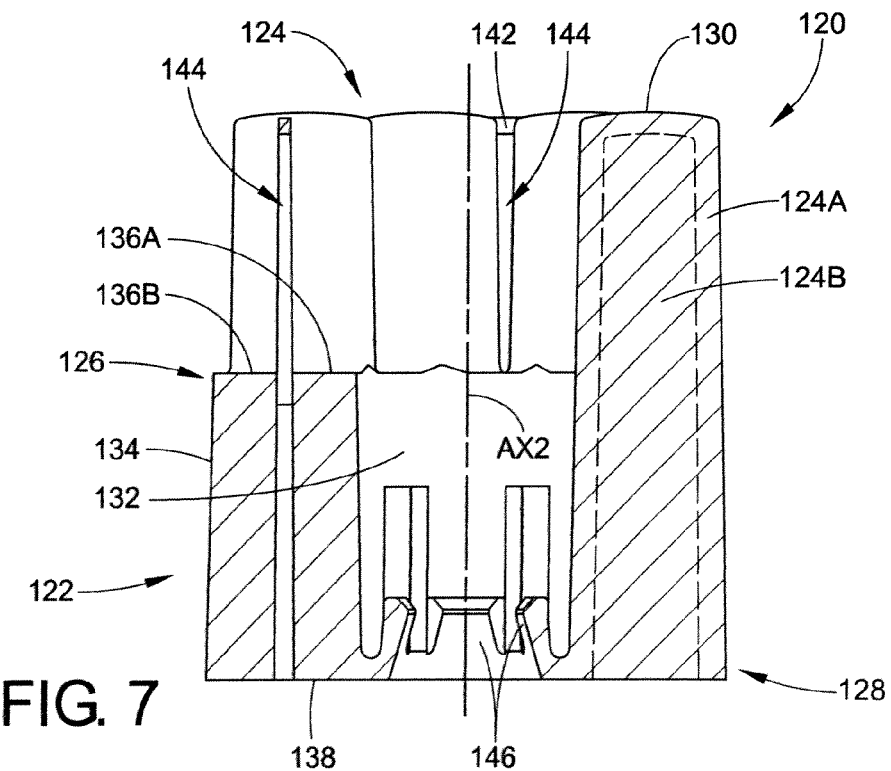
FIG. 7 is a cross-sectional side view of the jounce bumper shown in FIGS. 1-6 taken along Section Line 7-7 in FIG. 6.
Figure 8:
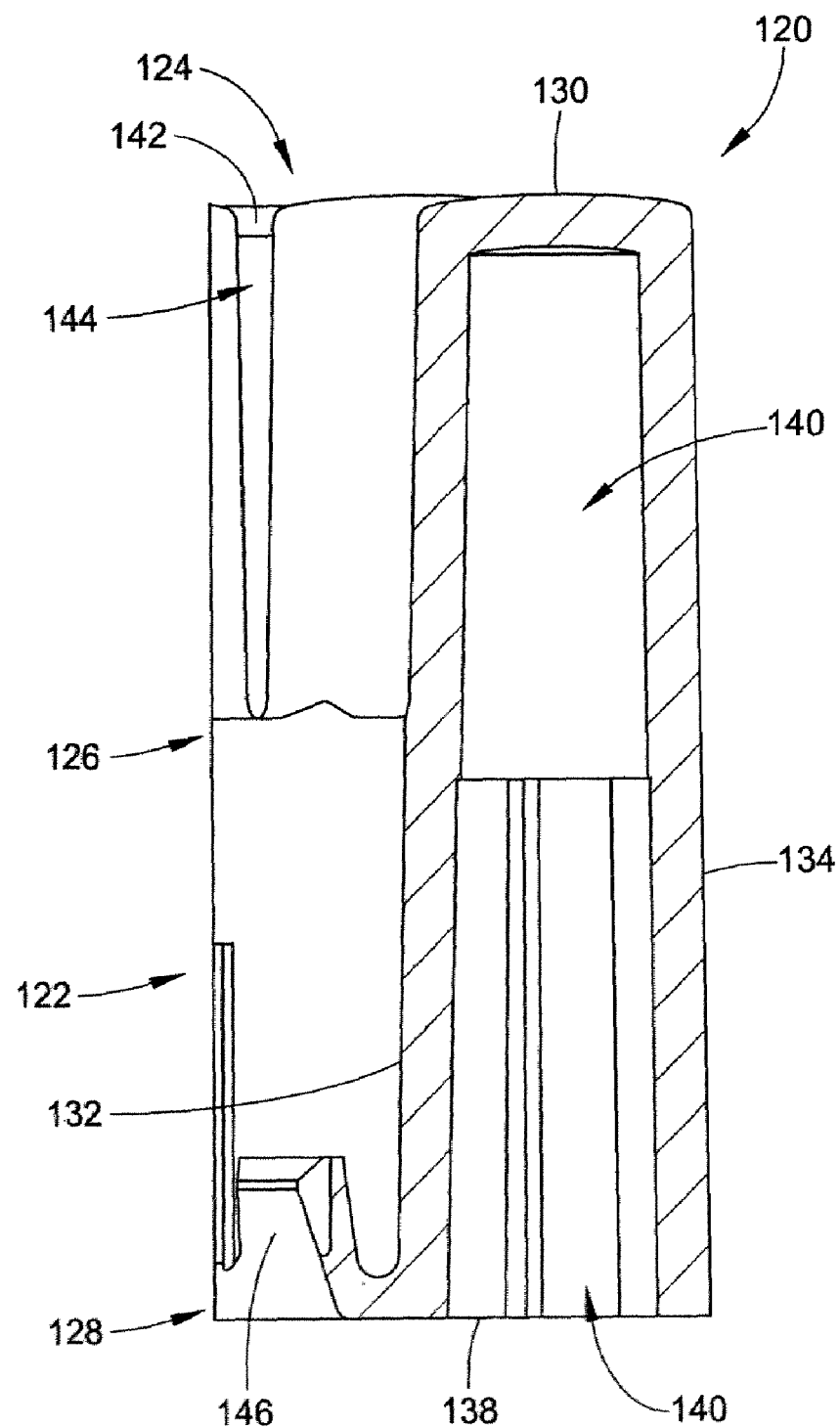
FIG. 8 is an enlarged cross-sectional side view of the rigid jounce bumper shown in FIGS. 1-7 taken along Section Line 8-8 in FIG. 6.
Figure 9:
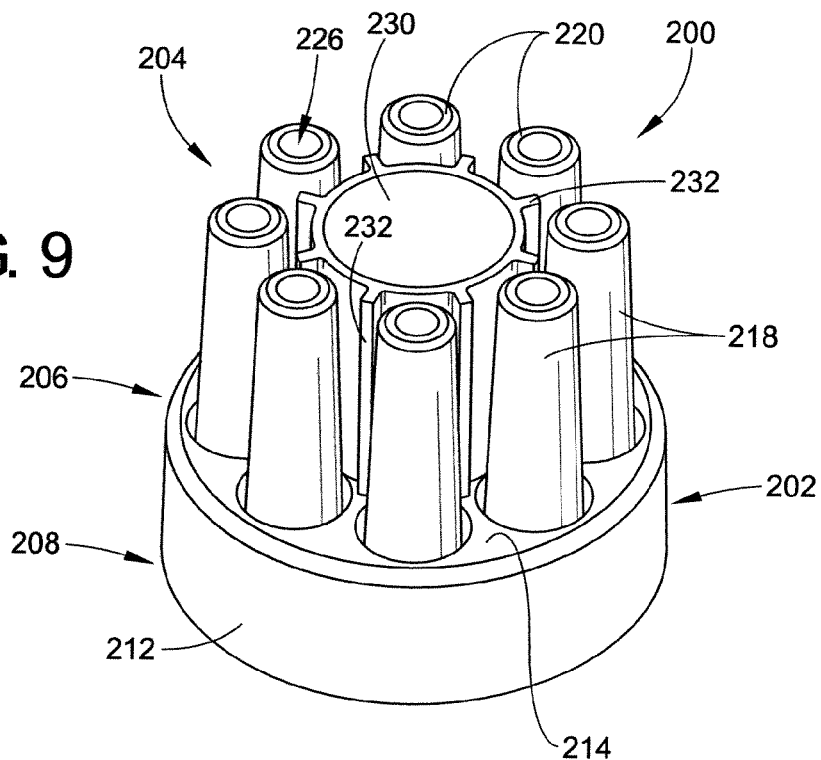
FIG. 9 is a top perspective view of another exemplary embodiment of a rigid jounce bumper in accordance with the present novel concept.
Figure 10:
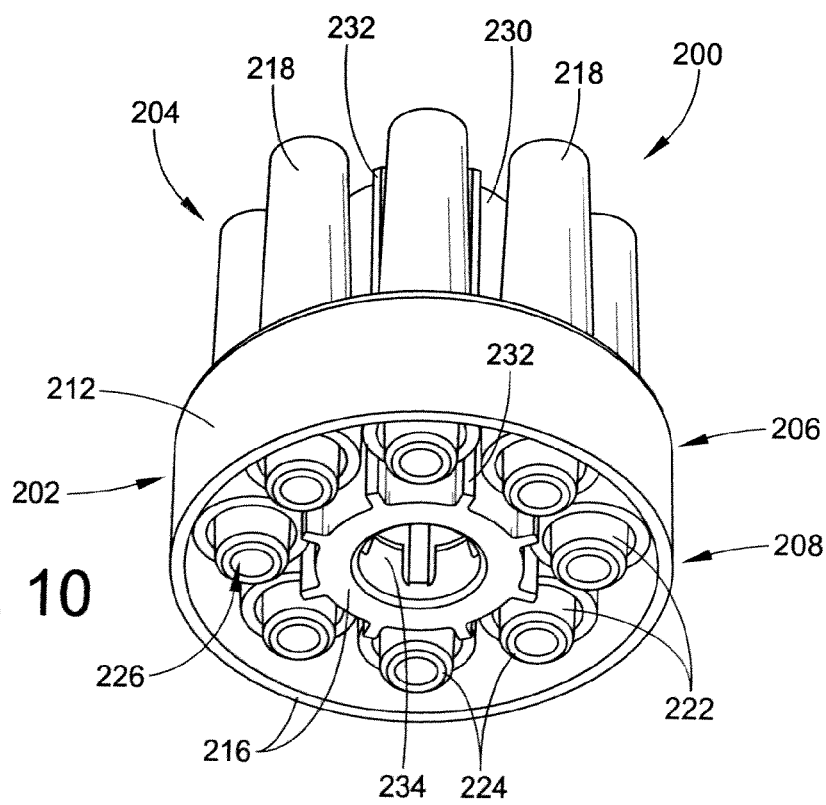
FIG. 10 is a bottom perspective view of the rigid jounce bumper shown in FIG. 9.
Figure 11:
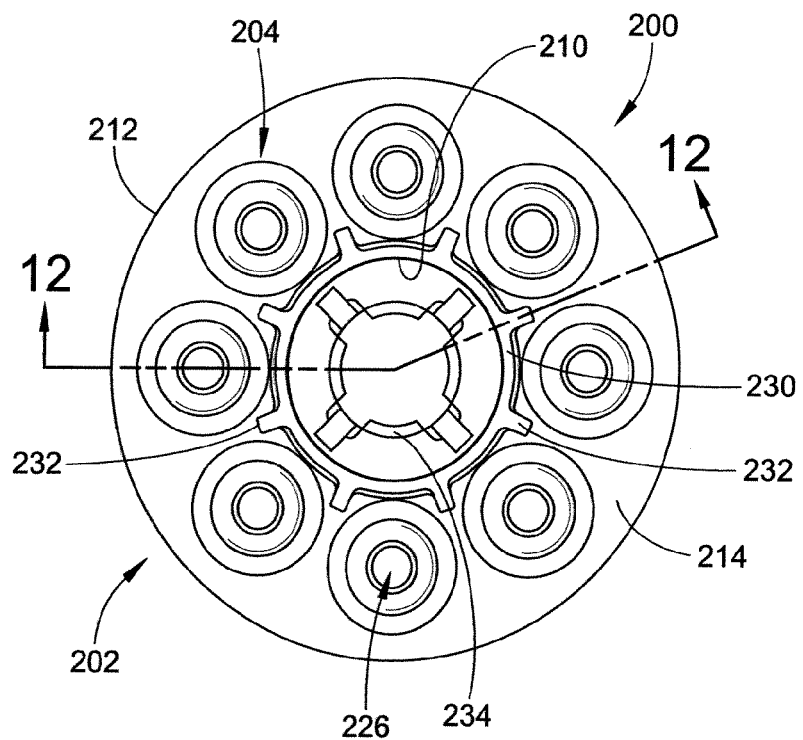
FIG. 11 is a top view of the rigid jounce bumper shown in FIGS. 9 and 10.
Figure 12:
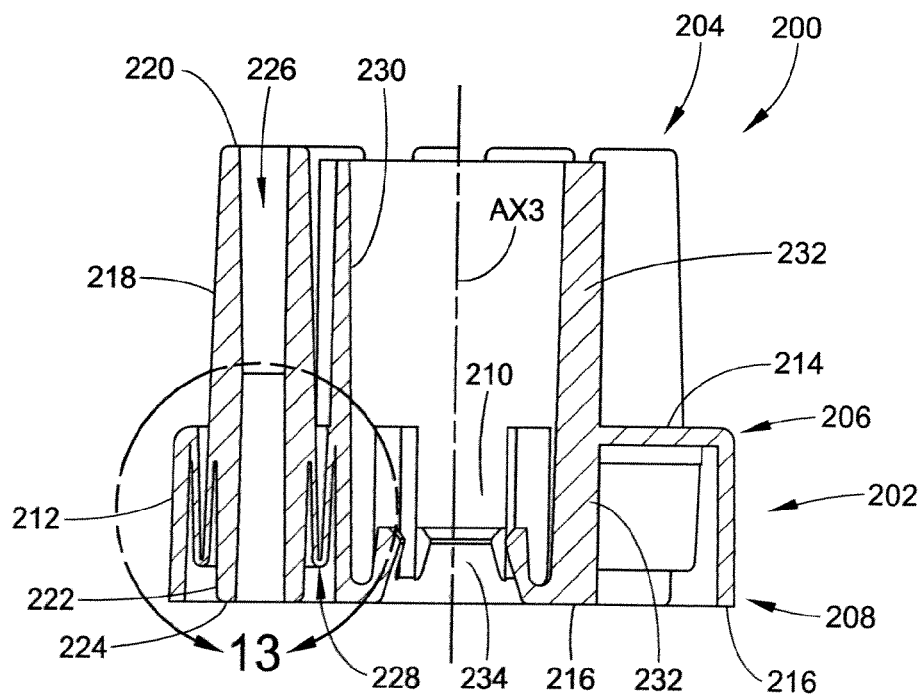
FIG. 12 is a cross-sectional side view of the rigid jounce bumper shown in FIGS. 9-11 taken along Section Line 12-12 in FIG. 11.
Figure 13:
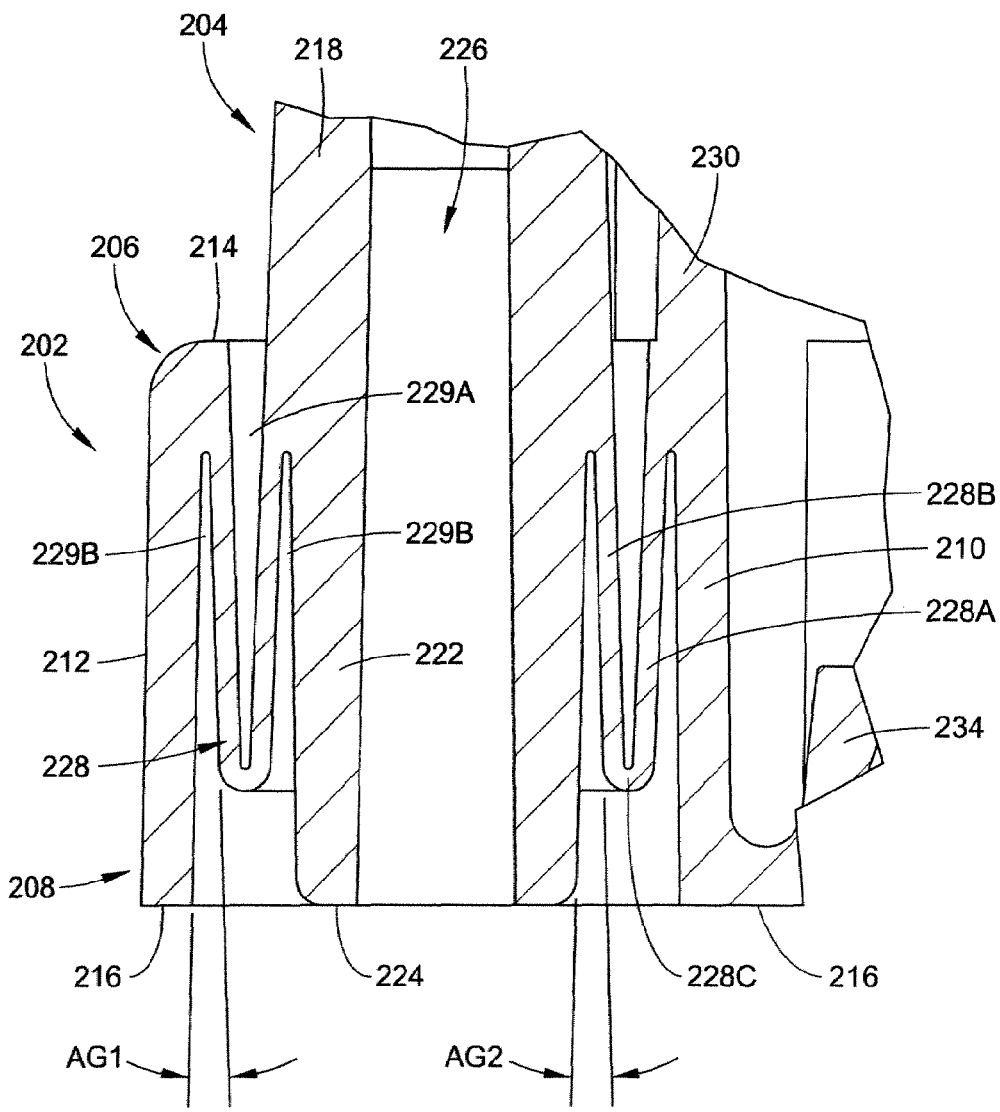
FIG. 13 is an enlarged cross-sectional view of the portion of the rigid jounce bumper shown in Detail 13 of FIG. 12.
Figure 14:
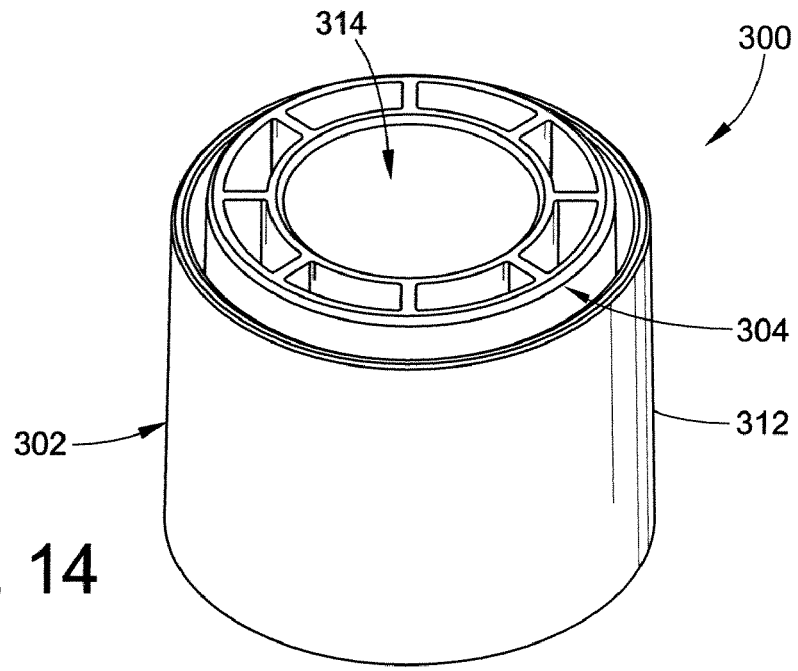
FIG. 14 is a top perspective view of still another exemplary embodiment of a rigid jounce bumper in accordance with the present novel concept.
Figure 15:
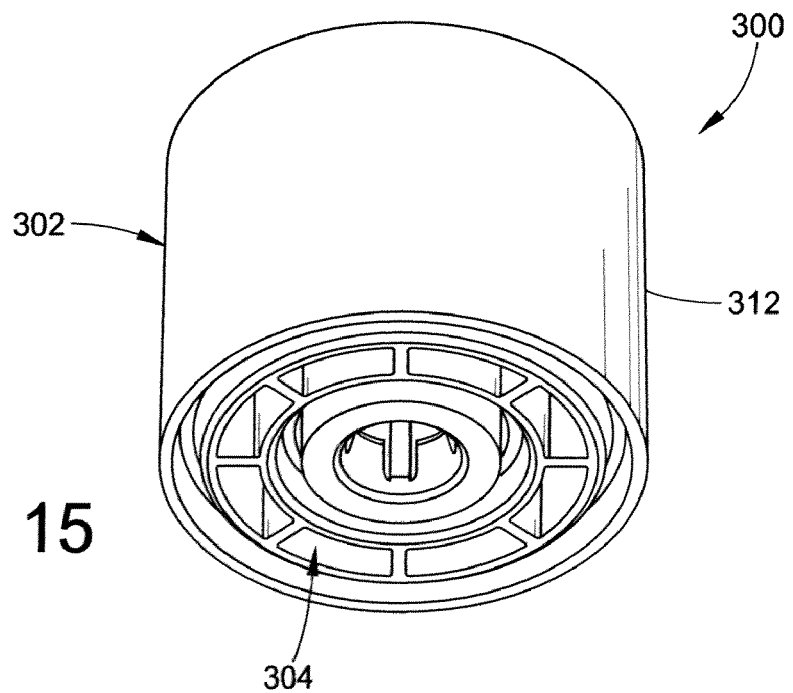
FIG. 15 is a bottom perspective view of the rigid jounce bumper shown in FIG. 14.
Figure 16:
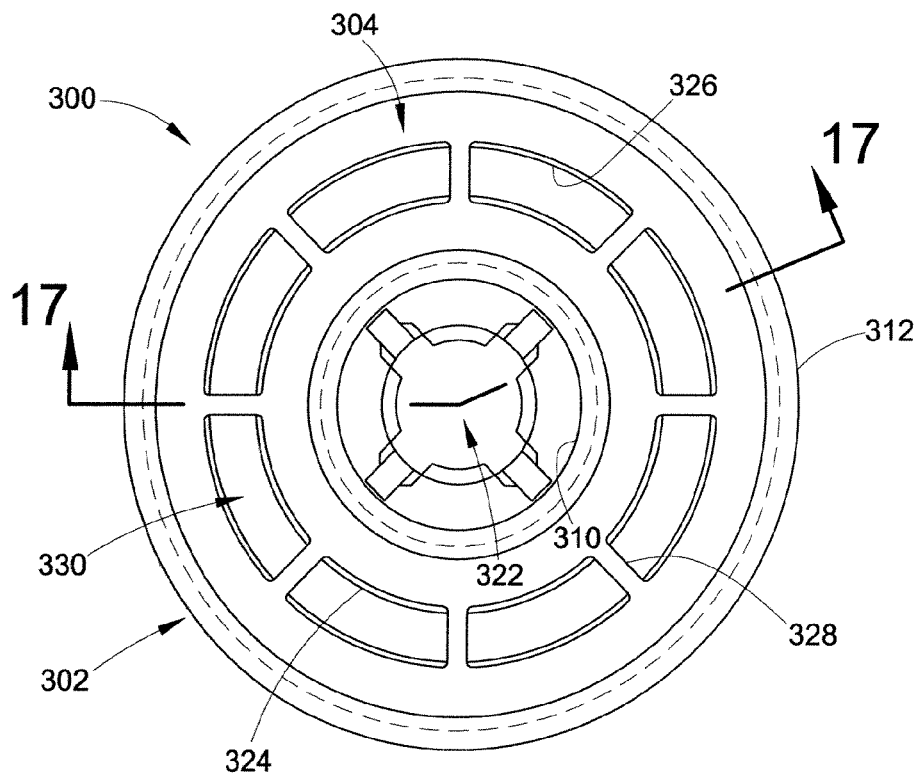
FIG. 16 is a top view of the rigid jounce bumper shown in FIGS. 14 and 15.
Figure 17:
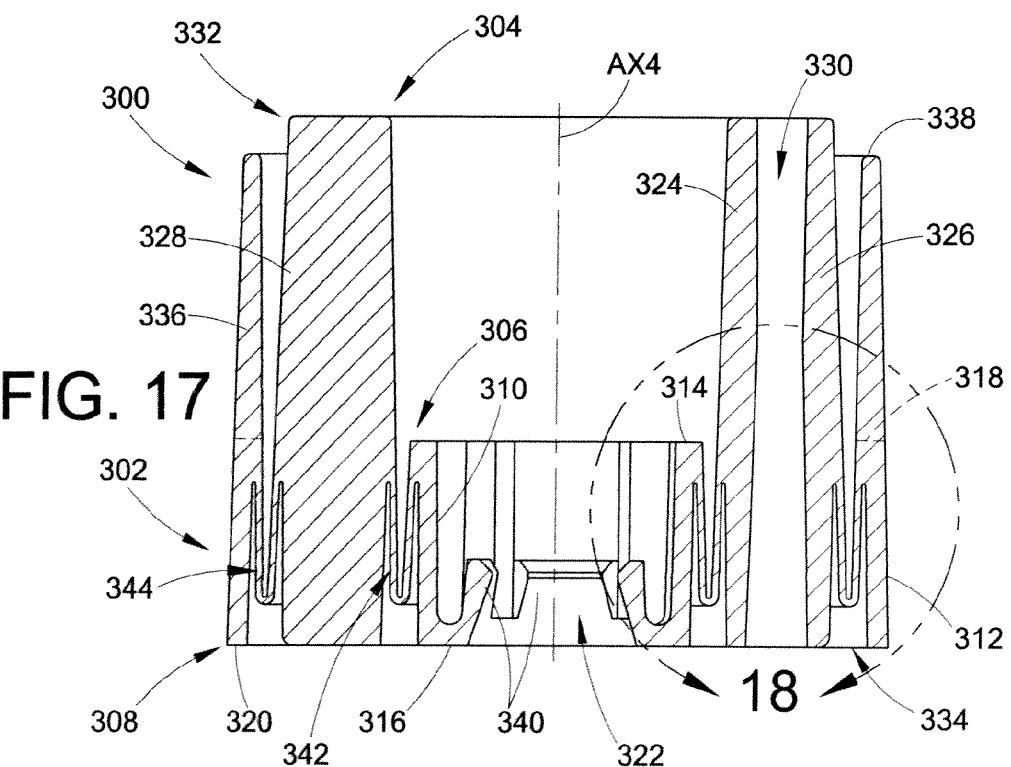
FIG. 17 is a cross-sectional side view of the rigid jounce bumper shown in FIGS. 14-16 taken along Section Line 17-17 of FIG. 16.
Figure 18:
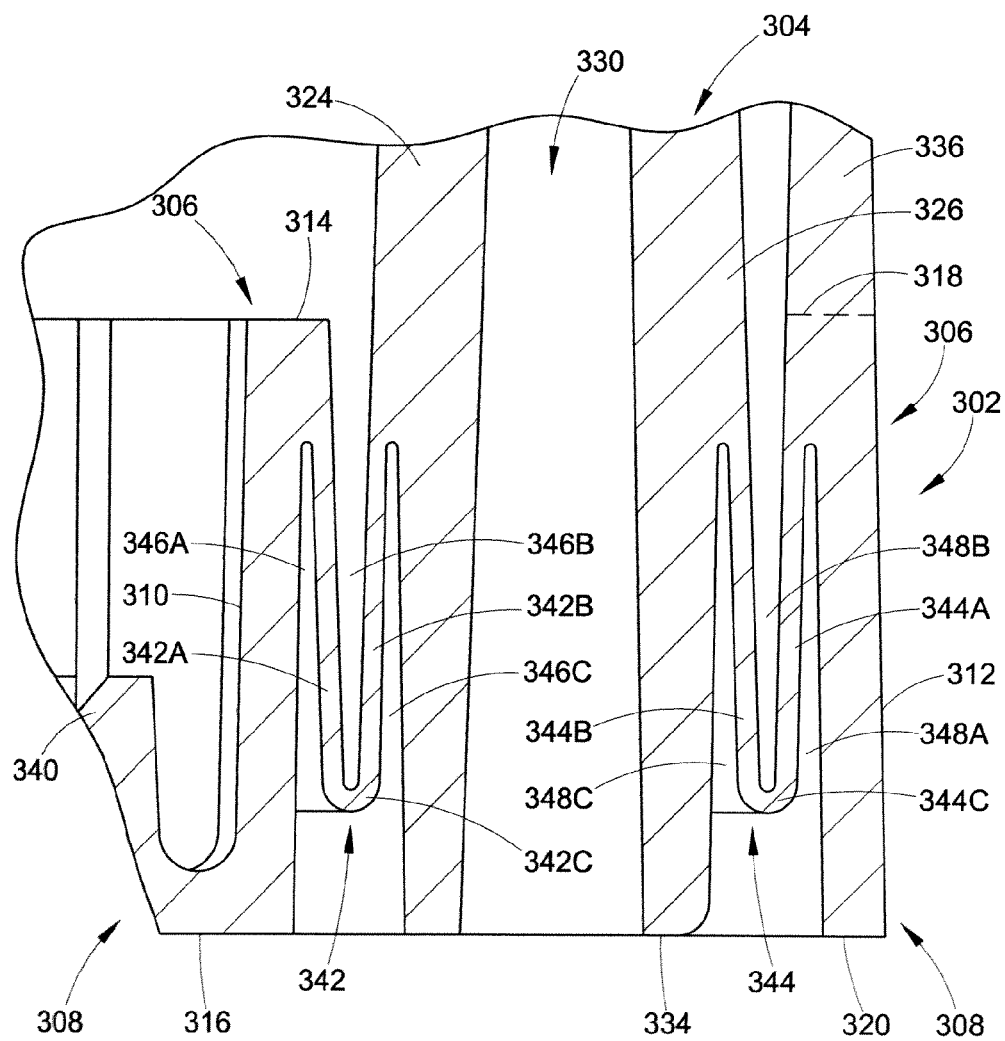
FIG. 18 is an enlarged cross-sectional view of the portion of the rigid jounce bumper shown in Detail 18 of FIG. 17.

Depending upon the design, configuration and other factors of a rigid jounce bumper in accordance with the present novel concept, the same can optionally include one or more connector walls 142 extending between adjacent ones of support segments 124. It will be appreciated that the one or more connector walls can be of any suitable size, shape and/or configuration. For example, in the exemplary embodiment shown, connector walls 142 extend only between free ends 130 of adjacent ones of the support segments such that gaps or openings 144 (FIGS. 7 and 8) are formed between the connector walls and first body end walls 136. While FIGS. 7 and 8 show adjacent ones of the support segments being interconnected with one another, it will be appreciated that such connector walls or other such structural features can be integrally formed between any two or more of the support segments or, alternately, can be provided as a separate component that is fitted onto or otherwise secured on any two or more of the support segments.

Additionally, as discussed above, it will be appreciated that a rigid jounce bumper in accordance with the present novel concept can be retained on or along one of the end members of the gas spring assembly in any suitable manner. For example, rigid jounce bumper 120 is shown as including securement tabs 146 projecting radially inwardly from along inner side wall 132 near second body end 128. It will be appreciated that securement tabs 146 can be of any suitable number, size, shape and/or configuration, such as may be suitable for interengaging bumper mount 118 (FIG. 1), for example.

Another exemplary embodiment of a rigid jounce bumper in accordance with the present novel concept is shown in FIGS. 9-13 and is generally identified therein by item number 200. This exemplary embodiment includes a body or body portion and at least one support segment extending from the body portion. It will be appreciated that the at least one support segment can include any suitable number of support segments, such as from 1 to 50 support segments, for example. In the exemplary embodiment shown in FIGS. 9-13, the body or body portion is identified by item number 202 and the at least one support segment includes a plurality of support segments, which support segments are collectively indicated by item number 204. Body 202 includes opposing first and second body ends 206 and 208 with a central axis AX3 extending therebetween. An inner side wall 210 and an outer side wall 212 extend between the first and second body ends and are disposed generally coaxially about axis AX3. Inner side wall 210 can optionally at least partially define a central opening or passage 211 through the rigid jounce bumper. In the exemplary embodiment shown, body 202 also includes a first or upper end wall 214 and a second or lower end wall 216 between which the inner and outer side walls generally extend.

In the exemplary embodiment shown in FIGS. 9-13, eight (8) support segments are shown extending from body 202 and disposed in approximately evenly spaced relation about the central axis. It will be appreciated, however, that any other suitable arrangement or spacing could alternately be used. Support segments 204 are shown in FIGS. 9-13 as extending outwardly from first end wall 214 of body 202 in a direction generally opposite second body end 208. The support segments include a first or upper segment wall portion 218 that, in the exemplary embodiment shown, extends from along first end wall 214 to a first or upper free end 220. The support segments also include a second or lower segment wall portion 222 that, in the exemplary embodiment shown, extends from approximately first end wall 214 to a second or lower free end 224. Optionally, a central passage or opening 226 can be formed into or through support segments In one preferred embodiment, second free ends 224 of the support segments are approximately aligned with second end wall 216 such that both the second free ends and the second end wall are positioned to abuttingly engage an associated end member, such as second end member 104 in FIG. 1, for example. Alternately, second free ends 224 could project outwardly beyond second end wall 216 such that, upon installation of the rigid jounce bumper on a gas spring assembly, the plurality of support segments can be somewhat preloaded against the associated end member. As a further alternative, the second free ends could be spaced inwardly from the second end wall. In such an arrangement, any axial load applied to the plurality of support segments, such as from contact with first end member 102 in FIG. 1, for example, will axially displace the support segments toward the opposing end member, such as second end member 104 in FIG. 1, for example, such that the second free ends of the support segments will eventually contact the opposing end member and thereby transfer the axial load therefrom or thereto.

Support segments 204 can be supported on body 202 in any suitable manner. For example, in the embodiment shown in FIGS. 9-13, an attachment wall 228 extends between body 202 and each of support segments 204. It will be appreciated that such an attachment wall can take any suitable shape and/or configuration. For example, in the embodiment shown in FIGS. 9-13, attachment wall 228 includes a first wall portion 228A (FIG. 13) that extends from along inner side wall 210, outer side wall 212 and first end wall 214 toward second body end 208 at an angle AG1 (FIG. 13) relative to outer side wall 212. Additionally, attachment wall 228 includes a second wall portion 228B (FIG. 13) that extends from along an associated support segment 204 toward second body end 208 at an angle AG2 (FIG. 13) relative to second segment wall portion 222. As the outer side wall and second segment wall portion may themselves have some draft or angle associated therewith, angles AG1 and AG2 can alternately be established with reference to axis AX3. Exemplary ranges for angles AG1 and AG2 are from about 0.5 degrees to about 85 degrees, though it will be appreciated that any other suitable ranges could alternately be used. Additionally, angles AG1 and AG2 can be of the same or different values, as may be desired.

Each of first and second wall portions 228A and 228B are shown as having generally frustoconical shapes and, thus, extends fully around the support segment associated therewith. It will be appreciated, however, that any other arrangement and/or configuration could alternately be used, such as using discrete wall portions disposed in spaced relation around the periphery of the support segments, for example. Additionally, first and second attachment wall portions 228A and 228B intersect at a hinge-like connection 228C (FIG. 13) that permits the wall portions to flex relative to one another by deforming gaps 229A (FIG. 13) and 229B (FIG. 13) which are respectively formed between inner surfaces (not numbered) of attachment wall portions 228A and 228B, and outer surfaces (not numbered) of the attachment wall portions with outer side wall 212 and second segment wall portion 222. To assist the attachment walls in flexing relative to the other structural features, attachment wall portions 228A-C are preferably adapted to flex relative to inner and outer side walls 210 and 212 as well as relative to one another. As such, the attachment wall or one or more portions thereof can have a reduced wall thickness in comparison to other structural features, such as inner and outer side walls 210 and 212, for example, such as a wall thickness of less than half of the wall thickness of such other structural features, for example.

In use, first and second free ends 220 and 224 of the support segments abuttingly engage opposing end members of a gas spring assembly or other opposing components of the sprung and unsprung masses. Thus, any axial load condition can be supported by the support segments. It will be recognized, however, that the support segments are not intended to support lateral load conditions or otherwise provide resistance to lateral displacement of the opposing components (e.g., first and second end members 102 and 104). Rather, support segments 204 are capable of moving with and in response to such lateral displacement such that the occurrence of permanent deformation or other damage to the rigid jounce bumper by such lateral movement can be avoided.

In some applications, it may be desirable to limit or otherwise prevent excessive lateral displacement of one or more of the support segments, such as may be due to the subject lateral load conditions. Thus, two or more of the support segments can be secured or otherwise connected or attached to one another in any suitable manner, such as may be suitable for minimizing lateral deflection and/or preventing splaying or other undesirable conditions, for example. As one example, adjacent ones of the support segments could optionally be secure to one another by one or more structural features (not shown in FIGS. 9-13), such as connector walls 142 and openings 144 in FIGS. 1-8, for example. It will be appreciated that such structural features can be integrally formed between the support segments or, alternately, provided as a separate component that is fitted onto or otherwise secured on two or more of the support segments, as discussed previously with regard to the earlier exemplary embodiment.

Additionally, or in the alternative, it may be desirable to provide supplemental axial support for the at least one support segment in addition to limiting or otherwise preventing excessive lateral displacement of the same. As such, another optional arrangement for providing such supplemental axial support as well as such lateral restraint to the one or more support segments includes providing either or both of inner and outer side walls 210 and 212 with one or more side wall extensions that project outwardly beyond first end wall 214 toward first free ends 220 of the one or more support segments. Though it will be appreciated that any suitable arrangement can alternately be used, in one preferred embodiment any such inner and/or outer side wall extensions will be shorter than the one or more support segments.

In the exemplary embodiment shown in FIGS. 9-13, an inner side wall extension 230 projects from inner side wall 210 outwardly beyond the first end wall and terminates before reaching free ends 220 of the support segments. Thus, in the exemplary embodiment shown, the support segments can be axially compressed by at least some amount before the supplemental axial support from the side wall extension will be initiated. Thus, in use, any such one or more inner side wall extensions 230 and/or outer side wall extensions (not shown), if provided, would be operative to provide additional axial support to the one or more support segments, as well as being operative to limit lateral deflection of the support segments.

Additionally, any such inner and/or outer side wall extensions can optionally include one or more axially extending ribs 232. In the exemplary embodiment shown, eight ribs 232 are space circumferentially about wall extension 230 between adjacent ones of the support segments and thereby form pockets that can further assist in minimizing lateral deflection of the support segments. Additionally, the wall extension and rib or ribs can also provide supplemental axial support under increased axial load conditions. As such, ribs 232 can optionally extend along inner side wall 210 to second end wall 216 as well as along wall extension 230. As discussed above, rigid jounce bumper 200 can be secured on gas spring assembly or other structural component in any suitable manner, such as by using securement tabs 234, for example.

Still another exemplary embodiment of a rigid jounce bumper in accordance with the present novel concept is shown in FIGS. 14-18 and is generally identified therein by item number 300. Rigid jounce bumper 300 includes a body or body portion 302, but differs from previously described embodiments (e.g., rigid jounce bumpers 120 and 200) in that only one support segment 304 extends from the body portion. Body 302 includes opposing first and second body ends 306 and 308 (FIGS. 17 and 18) with a central axis AX4 (FIG. 17) extending therebetween. An inner side wall 310 and an outer side wall 312 extend generally between the first and second body ends and are disposed approximately coaxially about the central axis. Inner side wall 310 can include a first inner end wall 314 and an opposing second inner end wall 316. Similarly, outer side wall 312 can include a first outer end wall, which is represented by line 318 in FIGS. 17 and 18, and an opposing second outer end wall 320. In the exemplary embodiment shown, second inner end wall 316 and second outer end wall 320 are disposed within an approximately common plane or otherwise approximately aligned with one another. In alternate embodiments, however, the second inner end wall could be disposed axially outwardly beyond the second outer end wall or disposed axially into the body portion relative to the second outer end wall. Additionally, the inner side wall can optionally at least partially define a central opening or passage 322 through the rigid jounce bumper.

Support segment 304 of rigid jounce bumper 300 can be of any suitable shape and/or configuration. In the exemplary embodiment shown, support segment 304 includes an inner support segment wall 324 and an outer support segment wall 326 that is spaced radially outwardly from the inner support segment wall such that a space or gap is formed therebetween. The inner and outer support segment walls can be interconnected to one another in any suitable manner, such as by way of one or more walls or wall portions extending therebetween. In the exemplary embodiment shown, a plurality of radially-extending wall portions 328 extend between the inner and outer support segment walls and thereby divide the space or gap therebetween into a plurality of support segment cavities 330.

Support segment 304 extends axially between a first support segment end 332 and an opposing second support segment end 334. In one preferred embodiment, second support segment end 334 is disposed in approximate alignment with at least one of second inner and second outer end walls 316 and 320. As discussed above with regard to other embodiments, however, the second support segment end could alternately be disposed axially inwardly or axially outwardly of the second inner and/or second outer end walls. Additionally, first support segment end 332 preferably extends axially outwardly beyond first outer end wall 318 such that a corresponding structural component, such as first end member 102 in FIG. 1, for example, will contact first support segment end 332 prior to contacting body 302 of the rigid jounce bumper.

Optionally, body 302 can include one or more side wall extensions that project axially outwardly beyond first inner and/or first outer end walls 314 and 316. In the exemplary embodiment shown, an outer side wall extension 336 projects from first outer end wall 318 to an outer wall extension end 338 that is preferably spaced axially-inwardly from first support segment end 332. As such, outer side wall extension 336 can provide supplemental axial and/or supplemental lateral support to support segment 304, such as has been described above with regard to inner side wall extension 230 in FIGS. 9-13, for example. Furthermore, as discussed above with regard to other exemplary embodiments, rigid jounce bumper 300 can be secured on gas spring assembly or other structural component in any suitable manner, such as by using securement tabs 340, for example.

It will be appreciated that body 302 and support segment 304 of rigid jounce bumper 300 can be operatively connected to one another in any suitable manner, such as by using one or more walls or wall portions, for example. In the exemplary embodiment shown, an inner attachment wall 342 and an outer attachment wall 344 respectively connect the support segment to inner and outer side walls 310 and 312. The inner and outer attachment walls are preferably adapted to flex or otherwise deform and thereby permit the support segment to move (e.g., lateral translation, axial translation and/or rotation) relative to body 302 or at least a portion thereof (e.g., inner side wall 310 and/or outer side wall 312). As such, it will be appreciated that the inner and outer attachment walls can take any suitable shape, arrangement and/or configuration, such as has been discussed above with regard to attachment walls 228, for example.

For example, inner and outer attachment walls can extend fully about axis AX4 or can include a plurality of segmented wall portions spaced from one another about axis AX4. Additionally, as discussed above with regard to attachment walls 228, inner and outer attachment walls 342 and 344 can include one or more attachment wall portions. For example, inner attachment wall 342 can include a first wall portion 342A that extends from along inner side wall 310 toward second body end 308, as shown in the exemplary embodiment in FIGS. 17 and 18. Additionally, inner attachment wall 342 can include a second wall portion 342B that extends from along inner support segment wall 324 of the support segment toward the second body end. First and second wall portions 342A and 342B can be interconnected with one another in any suitable manner, such as by forming a hinge-like connection or wall 342C that permits the wall portions to flex relative to one another by deforming gaps 346A-C formed thereby. Similarly, outer attachment wall 344 can include a first wall portion 344A that extends from along outer side wall 312 toward the second body end. A second wall portion 344B can extend from along outer support segment wall 326 of the support segment toward the second body end, and the first and second wall portions can be interconnected in a suitable manner, such as by forming a hinge-like connection or wall 344C, for example, with gaps 348A-C formed by and/or between the wall portions.

Figure 19:
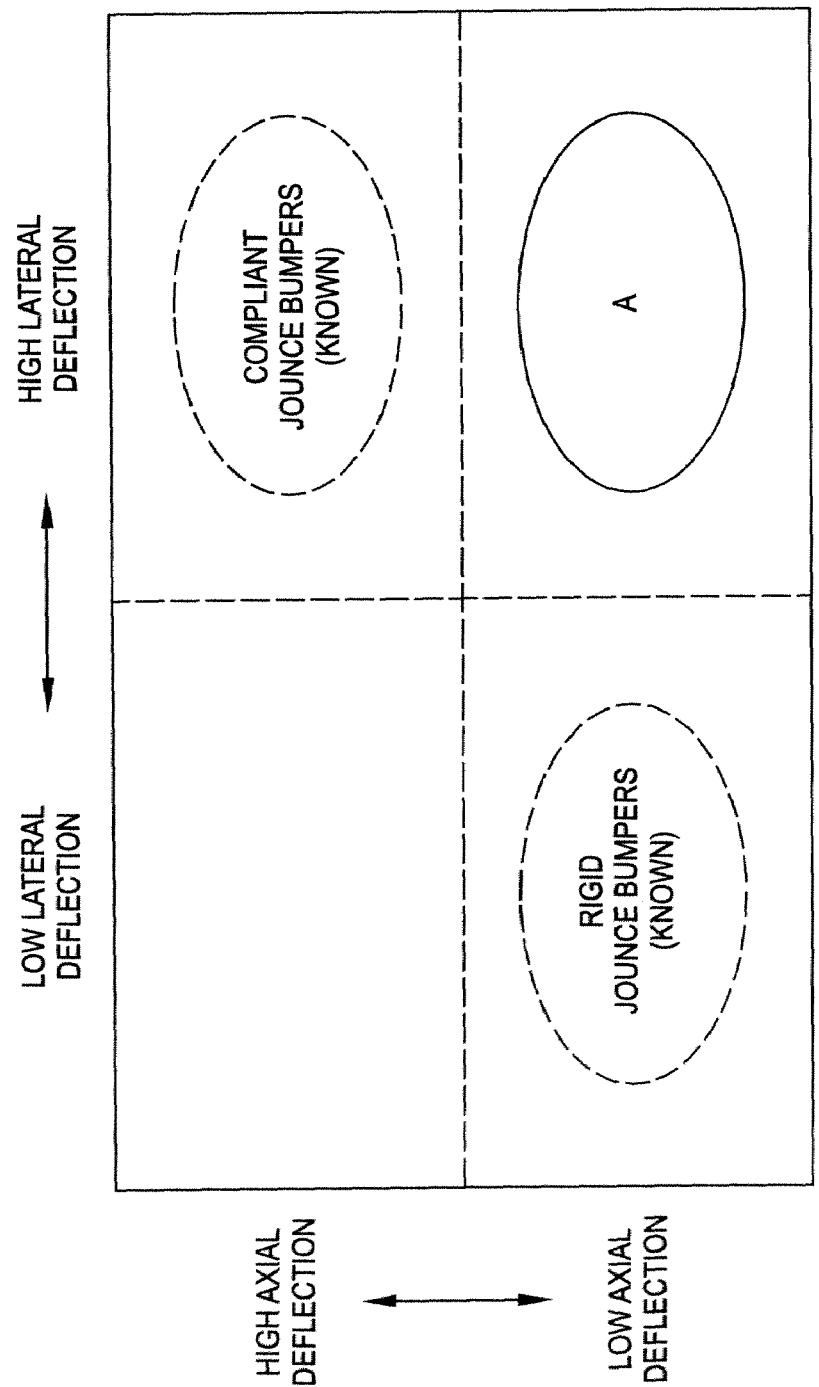
FIG. 19 is a graphical representation of lateral deflection versus axial deflection for compliant and rigid jounce bumpers.

The differences between the performance of known jounce bumpers and that of a jounce bumper in accordance with the present novel concept, such as rigid jounce bumpers 120, 200 and 300, for example, is illustrated by the graphical representation in FIG. 19. As shown therein, known rigid jounce bumpers provide the desirable characteristic of low axial deflection. However, such known rigid jounce bumpers can only withstand relatively low lateral deflection without undergoing permanent deformation or damage either along the jounce bumper itself, the securement point of the rigid jounce bumper to the corresponding structural component or both. Conversely, known compliant jounce bumpers can withstand substantially greater lateral deflection, as illustrated in FIG. 19. However, such jounce bumpers also exhibit high axial deflection. Rigid jounce bumpers in accordance with the present novel concept are capable of providing both relatively low axial deflection as well as relatively high lateral deflection, as represented by area A in FIG. 19.

As used herein with reference to certain elements, components and/or structures (e.g., "first end member" and "second end member"), numerical ordinals merely denote different singles of a plurality and do not imply any order or sequence unless specifically defined by the claim language. Additionally, the term "gas" is used herein to broadly refer to any gaseous or vaporous fluid. Most commonly, air is used as the working medium of suspension systems and the components thereof, such as those described herein. However, it will be understood that any suitable gaseous fluid could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A rigid jounce bumper comprising:
a body having a longitudinally-extending axis and including inner and outer side walls disposed about said axis, said inner and outer side walls extending longitudinally along said axis between opposing first and second body ends with at least one body cavity disposed between said inner and outer side walls; and,
a plurality of support segments projecting axially outwardly beyond said first body end in a direction generally opposed said second body end, said plurality of support segments disposed about said axis with each of said plurality of support segments including a segment side wall at least partially defining a segment cavity formed therein;
said body and said plurality of support segments being formed from a substantially non-elastomeric material such that said jounce bumper can support axially applied loads without substantial axial deflection while said segment side walls of said plurality of support segments can deflect relative to said body under laterally-applied loads.

2. A rigid jounce bumper according to claim 1, wherein said body includes a first end wall extending from one of said inner and outer side walls in approximately transverse relation to said axis.

3. A rigid jounce bumper according to claim 2, wherein said plurality of support segments include a fixed end substantially rigidly connected to said first end wall and an opposing free end spaced from said first end wall.

4. A rigid jounce bumper according to claim 3, wherein said plurality of support segments include a segment end wall at least partially defining said segment cavity.

5. A rigid jounce bumper according to claim 1, wherein said plurality of support segments include a first segment end disposed outwardly from said body beyond said first body end thereof and a second segment end disposed within said body toward said second body end thereof.

6. A rigid jounce bumper according to claim 5, wherein said plurality of support segments are operatively secured on said body by one or more attachment walls extending between said body and said plurality of support segments.

7. A rigid jounce bumper according to claim 5, wherein said body includes a substantially planar second end wall disposed along said second body end, and at least a portion of said second segment ends of said plurality of support segments are disposed in approximate alignment with said second end wall.

8. A rigid jounce bumper adapted for securement along an associated end member of an associated gas spring within an associated spring chamber thereof, said rigid jounce bumper comprising:
a body portion having a central axis extending between spaced first and second body ends, said body portion including inner and outer side walls extending circumferentially about said axis between said first and second body ends, said inner side wall at least partially defining a central passage through said body portion, and said body portion including at least one body cavity formed thereinto from along said first body end and extending toward said second body end with said at least one body cavity disposed radially between said inner and outer side walls; and,
at least one support segment disposed about said axis, said at least one support segment including a first segment wall portion projecting outwardly from said second body end of said body portion and a second segment wall portion extending from said first segment wall portion toward said first body end of said body portion;
said body portion and said at least one support segment being formed from at least one substantially-rigid plastic material such that said rigid jounce bumper is capable of supporting an axially-applied load without substantial axial deformation while said at least one support segment is capable of laterally deflecting under a laterally-applied load.

9. A rigid jounce bumper according to claim 8, wherein a plurality of support segments are disposed about said axis, and said first segment wall portion of said plurality of support segments has an approximately circular cross section such that at least a portion of said first segment wall portion has one of an approximately cylindrical shape and an approximately frustoconical shape.

10. A rigid jounce bumper according to claim 9, wherein said second segment wall portion of said plurality of support segments has an approximately rectangular cross section such that at least a portion of said second segment wall portion is a substantially planar wall extending between said inner and outer side walls of said body portion.

11. A rigid jounce bumper according to claim 9, wherein said second segment wall portion of said plurality of support segments has an approximately circular cross section such that at least a portion of said second segment wall portion has one of an approximately cylindrical shape and an approximately frustoconical shape.

12. A rigid jounce bumper according to claim 11, wherein said plurality of support segments are displaceably connected to said body portion by one or more attachment walls.

13. A rigid jounce bumper according to claim 12, wherein each of said attachment walls circumferentially extends about one of said plurality of support segments and is connected to at least one of said inner and outer side walls of said body portion.

14. A rigid jounce bumper according to claim 12, wherein said inner and outer side walls of said body portion each have a cross-sectional wall thickness, and said one or more connector walls have a cross-sectional wall thickness that is less than approximately one half of said cross-sectional wall thickness of at least one of said inner and outer side walls such that said one or more connector walls can flex relative to said inner and outer side walls.

15. A rigid jounce bumper according to claim 8, wherein one of said inner side wall and said outer side wall of said body portion extends axially outwardly from said body portion beyond said second body end and thereby forms a corresponding one of a radially-inward support wall and a radially-outward support wall for said at least one support segment to thereby provide supplement axial support thereto and prevent excessive lateral deflection thereof.

16. A rigid jounce bumper according to claim 8, wherein a plurality of support segments are disposed about said axis, and two or more of said plurality of support segments are interconnected to one another along said first segment wall portions thereof.

17. A rigid jounce bumper according to claim 16, wherein adjacent ones of said plurality of support segments are interconnected to one another by an interconnecting web wall extending therebetween.

18. A gas spring assembly comprising:
a first end member;
a second end member spaced from said first end member;
a flexible wall secured between said first and second end members and at least partially defining a spring chamber therebetween, said flexible wall at least partially defining a central axis extending longitudinally between said first and second end members; and,
a rigid jounce bumper supported within said spring chamber along one of said first and second end members, said rigid jounce bumper including a bumper body having an central axis, and said rigid jounce bumper including at least one support segment operatively connected said bumper body such that said at least one support segment can deflect under a laterally-applied load without undergoing permanent plastic deformation as well as support an axially-applied load without substantial axial deflection;
said rigid jounce bumper being at least partially formed from a non-elastomeric plastic material having an elongation at its elastic tensile limit of less than about 150 percent; and,
said at least one support segment including an axially-extending side wall that at least partially forms a segment cavity within said at least one support segment, said axially-extending side wall including a first side wall portion that extends at least partially into said bumper body and a second side wall portion that projects outwardly beyond said bumper body.

19. A gas spring assembly according to claim 18, wherein said at least one support segment includes from 1 to 25 support segments.

20. A gas spring assembly according to claim 18, wherein said first end member includes a bumper mount extending therefrom into said spring chamber, and said body portion includes a plurality of projections extending radially inwardly from along said inner side wall, said plurality of projections being complimentary to said bumper mount of said first end member such that said rigid jounce bumper is secured thereon by interengagement of said bumper mount and said plurality of projections.

\* \* \* \* \*